US010585233B2

(12) United States Patent
Liu

(10) Patent No.: US 10,585,233 B2
(45) Date of Patent: Mar. 10, 2020

(54) EDGE LIT PANEL LIGHTING DEVICES WITH MULTIPLE GROUPS OF LEDS

(71) Applicant: Troy-CSL Lighting, Inc., City of Industry, CA (US)

(72) Inventor: Allen Liu, City of Industry, CA (US)

(73) Assignee: TROY-CSL LIGHTING, INC., City of Industry, CA (US)

(*) Notice: Subject to any disclaimer, the term of this patent is extended or adjusted under 35 U.S.C. 154(b) by 0 days.

(21) Appl. No.: 15/960,464

(22) Filed: Apr. 23, 2018

(65) Prior Publication Data

US 2019/0324182 A1 Oct. 24, 2019

(51) Int. Cl.
| | |
|---|---|
| *F21V 8/00* | (2006.01) |
| *F21V 23/04* | (2006.01) |
| *F21Y 103/10* | (2016.01) |
| *F21Y 113/13* | (2016.01) |
| *F21Y 115/10* | (2016.01) |

(52) U.S. Cl.
CPC ............. *G02B 6/009* (2013.01); *F21V 23/04* (2013.01); *G02B 6/0088* (2013.01); *F21Y 2103/10* (2016.08); *F21Y 2113/13* (2016.08); *F21Y 2115/10* (2016.08); *G02B 6/005* (2013.01); *G02B 6/0051* (2013.01); *G02B 6/0055* (2013.01)

(58) Field of Classification Search
CPC .. G02B 6/0068; G02B 6/0073; F21Y 2113/10
USPC ................................................ 362/612–613
See application file for complete search history.

(56) References Cited

U.S. PATENT DOCUMENTS

| | | | | |
|---|---|---|---|---|
| 6,988,813 | B2* | 1/2006 | Hoelen | G02B 6/0038 |
| | | | | 362/555 |
| 7,553,060 | B2* | 6/2009 | Tanabe | G02B 6/0068 |
| | | | | 362/612 |
| 7,994,725 | B2 | 8/2011 | Bouchard | |
| 8,292,486 | B2* | 10/2012 | Wang | H05B 37/02 |
| | | | | 362/612 |
| 8,303,152 | B2* | 11/2012 | Kawashima | G02B 6/0073 |
| | | | | 349/65 |
| 8,702,295 | B2* | 4/2014 | Lin | G02B 6/0083 |
| | | | | 362/612 |
| 9,488,327 | B2 | 11/2016 | Van Gheluwe et al. | |
| 2007/0064444 | A1* | 3/2007 | Kim | G02B 6/0031 |
| | | | | 362/612 |

(Continued)

FOREIGN PATENT DOCUMENTS

CN 106390299 A 2/2017

OTHER PUBLICATIONS

Bason Lighting, "BASON RGB LED Under Cabinet Lighting Closet Puck lights Color Changing for Kitchen Shelf Decoration, 20 Colors, Dimmable Remote Control, 7.5 Watts, 4-PACL, UL listed, #4P58862H", Amazon.com, 10 pages.

*Primary Examiner* — Robert J May
(74) *Attorney, Agent, or Firm* — Foley & Lardner LLP

(57) ABSTRACT

A lighting device includes a transparent body member, a light emitting diode (LED) strip at a periphery of the transparent body member, and a switch connected to the LED strip. The LED strip includes a first group of LED elements arranged along a length direction of the LED strip, and a second group of LED elements arranged along the length direction of the LED strip. The switch can turn ON the first group of LED elements when the switch is in a first state, and can turn ON the second group of LED elements when the switch is in a second state.

22 Claims, 5 Drawing Sheets

(56) References Cited

U.S. PATENT DOCUMENTS

| | | |
|---|---|---|
| 2007/0223243 A1 | 9/2007 | Yeoman et al. |
| 2012/0155116 A1 | 6/2012 | Gardner |
| 2013/0258714 A1* | 10/2013 | Huang .................... G09F 13/04 362/612 |
| 2014/0036533 A1 | 2/2014 | Smith-Gillespie |
| 2017/0232307 A1 | 8/2017 | Weilong |
| 2017/0299797 A1* | 10/2017 | Ezell .................... G02B 6/0055 |

* cited by examiner

EDGE LIT PANEL LIGHTING DEVICES WITH MULTIPLE GROUPS OF LEDS

BACKGROUND

Lighting devices can include a plurality of light sources such as, but not limited to, light emitting diodes (LEDs) that collectively emit light to provide illumination. Typically, the LEDs are centrally arranged to emit light downward towards an optic or window. In this case, the location of the LEDs can be individually distinguishable, for example, as visible bright spots corresponding to the locations of the LEDs and darker regions between the locations of the LEDs, that can be observed through the optic or window. Further, these bright spots and dark regions are particularly noticeable, when one or more of LEDs are ON and others are OFF.

The above information disclosed in this Background section is for enhancement of understanding of the background of the invention, and therefore, it may contain information that does not constitute prior art.

SUMMARY

One or more examples and aspects described herein relate to a lighting device including a light source strip that emits light inward from a periphery of a panel configured to be edge lit, to illuminate the panel as an edge-lit panel. Other examples and aspects described herein relate to a lighting assembly including the light source strip. One or more examples and aspects described herein relate to a lighting device having a light source strip that is controlled to change a color, frequency or color temperature of the light illuminating from a transparent element, and a lighting assembly having that light source strip.

According to an example embodiment, a lighting device includes: a panel configured to be edge lit; a light emitting diode (LED) strip at a periphery of the panel; and a switch connected to the LED strip. The LED strip includes: a first group of LED elements arranged along a length direction of the LED strip; and a second group of LED elements arranged along the length direction of the LED strip. The switch is configured to turn ON the first group of LED elements when the switch is in a first state, and to turn ON the second group of LED elements when the switch is in a second state.

In an example embodiment, the first and second groups of LED elements may be arranged on the LED strip to face inward from the periphery of the panel.

In an example embodiment, the LED strip may be configured to illuminate the panel.

In an example embodiment, the switch may be configured to turn OFF the second group of LED elements when the switch is in the first state, and to turn OFF the first group of LED elements when the switch is in the second state.

In an example embodiment, the switch may be configured to turn OFF the second group of LED elements when the switch is in the first state, and to turn ON both the first and second group of LED elements when the switch is in the second state.

In an example embodiment, the first group of LED elements may be of a different color than that of the second group of LED elements.

In an example embodiment, the first group of LED elements may be of a different temperature than that of the second group of LED elements.

In an example embodiment, the first group of LED elements may be alternately arranged with the second group of LED elements along the length direction of the LED strip.

In an example embodiment, the first group of LED elements may be arranged along a first row along the length direction of the LED strip, and the second group of LED elements are arranged along a second row parallel to the first row along the length direction of the LED strip.

In an example embodiment, the lighting device may further include a third group of LED elements arranged along the length direction of the LED strip.

In an example embodiment, the first, second, and third group of LED elements may be of a different color from each other.

In an example embodiment, the first, second, and third group of LED elements may be of a different temperature from each other.

In an example embodiment, the first, second, and third group of LED elements may be alternately arranged along the length direction of the LED strip.

In an example embodiment, the first group of LED elements may be arranged along a first row along the length direction of the LED strip, and the second group of LED elements may be alternately arranged with the third group of LED elements along a second row parallel to the first row along the length direction of the LED strip.

In an example embodiment, the first group of LED elements may be aligned with corresponding spaces between the alternating second and third group of LED elements.

In an example embodiment, each of the first group of LED elements may be aligned with each of the second and third group of LED elements.

According to an example embodiment, a lighting assembly includes: a light emitting diode (LED) strip arranged at a periphery of a panel configured to be edge lit; and a switch connected to the LED strip. The LED strip includes: a first group of LED elements arranged along a length direction of the LED strip and facing inward from the periphery of the panel; and a second group of LED elements arranged along the length direction of the LED strip and facing inward from the periphery of the panel. The switch is configured to turn ON the first group of LED elements when the switch is in a first state, and to turn ON the second group of LED elements when the switch is in a second state.

In an example embodiment, the first group of LED elements may be of a different color or temperature than that of the second group of LED elements.

In an example embodiment, the first group of LED elements may be alternately arranged with the second group of LED elements along the length direction of the LED strip.

In an example embodiment, the first group of LED elements may be arranged along a first row along the length direction of the LED strip, and the second group of LED elements may be arranged along a second row parallel to the first row along the length direction of the LED strip.

BRIEF DESCRIPTION OF THE DRAWINGS

The above and other aspects and features of the present invention will become more apparent to those skilled in the art from the following detailed description of the example embodiments with reference to the accompanying drawings, in which.

DETAILED DESCRIPTION

Figure 1A:
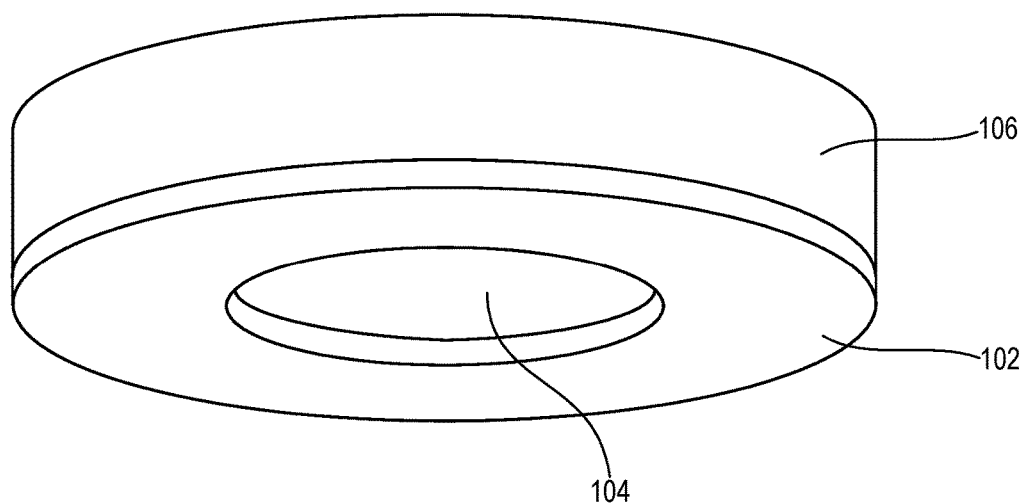
FIGS. 1A and 1B are perspective views of lighting devices according to various examples.

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

According to various embodiments, a lighting device may include a light source strip having two or more separately-controllable groups of light elements that may be controlled to activate in separate groups. The light source strip is arranged at least partially around a periphery of one or more transparent or partially transparent panels (forming an edge lit panel ELP structure) or light guide member, to direct light from the light elements into the ELP or light guide member, through its periphery. The transparent or partially transparent ELP or light guide member has a light emitting face directed transverse or perpendicular to the direction in which light from the light elements is directed into the ELP or light guide member. Each group of light elements may include one or more (or a plurality of) light elements arranged along a length direction of the light source strip and arranged to emit light inward from the periphery of the ELP or light guide member. The lighting elements of each separately-controllable group of light elements may be arranged and directed inward through one or more (or all) side peripheral edges of the ELP or light guide member, such that the light emitting face of the ELP or light guide member may be illuminated relatively evenly (e.g., evenly or substantially evenly), when one or more (or any) group or groups of light elements are (is) activated. Accordingly, in certain examples, bright spots or dark spots on the light emitting face of the ELP light guide member may be eliminated or reduced, regardless of which separately-controllable group or groups of light elements are activated.

According to various embodiments, the light source strip may include two or more groups of LED elements that may be separately-controlled, in that they may be controlled to be activated in separate groups (or, for some examples, in multiple groups together), to change a color or color temperature of the illumination of the light emitting face of the light guide member. In some embodiments, one or more different groups of LED elements may be activated (turned ON) or deactivated (turned OFF) to control a temperature or brightness of the illumination. In some embodiments, one or more different groups of LED elements having respectively different colors or temperatures may be controlled, to change a color or color temperature of the illumination.

Figure 1B:
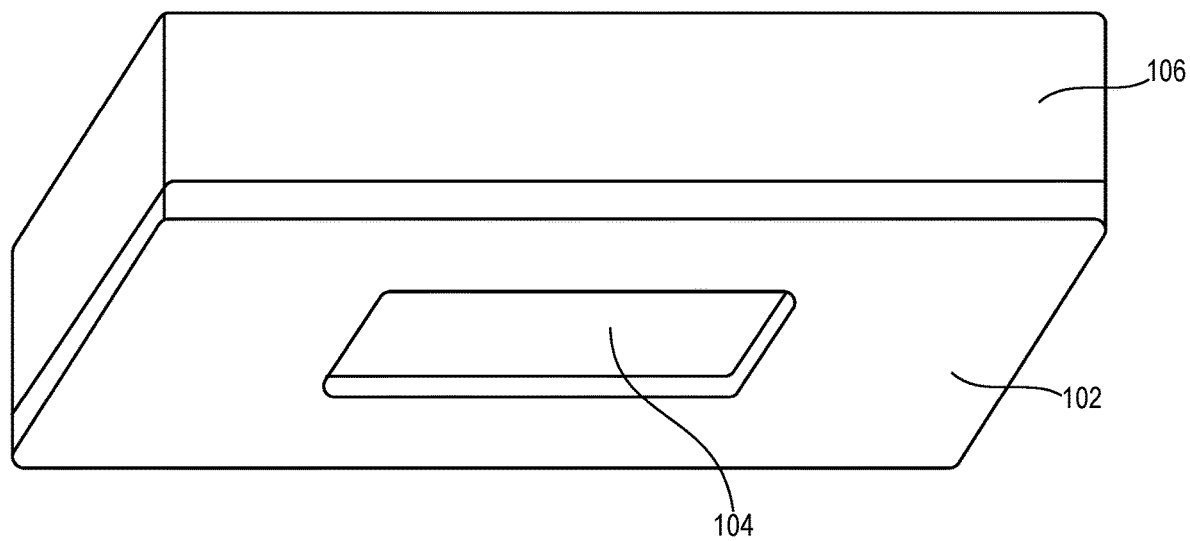

FIGS. 1A and 1B are perspective views of two examples lighting devices according to certain embodiments of the present invention, where like elements in those drawings are labeled with like reference numbers. Referring to FIGS. 1A and 1B, the lighting device 100 may include a cover 102, an optic (or a lens assembly) 104, and a housing member 106. The optic 104 is located on a light emitting side of the lighting device 100. In the example in FIGS. 1A and 1B, the light emitting side is the downward-directed surface of the lighting device 100.

The cover and the housing may be generally rigid structures made of any suitable material or materials, including, but not limited plastic, metal, ceramic, wood, composite material, or the like. In particular examples, the cover and the housing are generally opaque and may have a decorative color, style, texture, ornamentation, or the like. In the drawings, the cover 102 is a separate element relative to the housing member 106 and is attachable to the housing member 106 to form an enclosed space within the housing member 106. In other examples, the cover 102 may be formed unitary with or fixed to the housing member 106, as a single element.

In FIG. 1A, the lighting device 100 has a cylindrical housing member 106, and a circular-shaped light emitting side. In FIG. 1B, the lighting device 100 has a cube-shaped housing 106 with a generally square shaped light emitting side. However, other embodiments may include a lighting device having other suitable shapes. For example, in other embodiments, the light emitting side, the housing member 106 and associated cover 102 (or each) may have other shapes, such as, but are not limited to, a triangular shape, a quadrilateral shape, a pentagonal shape, a hexagonal shape, a heptagonal shape, an octagonal shape, a star shape, or any other suitable shape.

In various embodiments, the optic 104 may be arranged on a back surface of the cover 102, and the cover 102 may have an opening to expose the optic 104 through a front surface of the cover 102 (the surface facing downward in FIGS. 1A and 1B). Accordingly, the front surface of the cover 102 may include or form a rim or a bezel surrounding the opening. In some embodiments, the bezel of the cover 102 may have a sufficient width to overlap with (e.g., cover or hide) a light source strip within the housing member 106. The light source strip is discussed in more detail with reference to FIGS. 2 through 4C.

Figure 2:
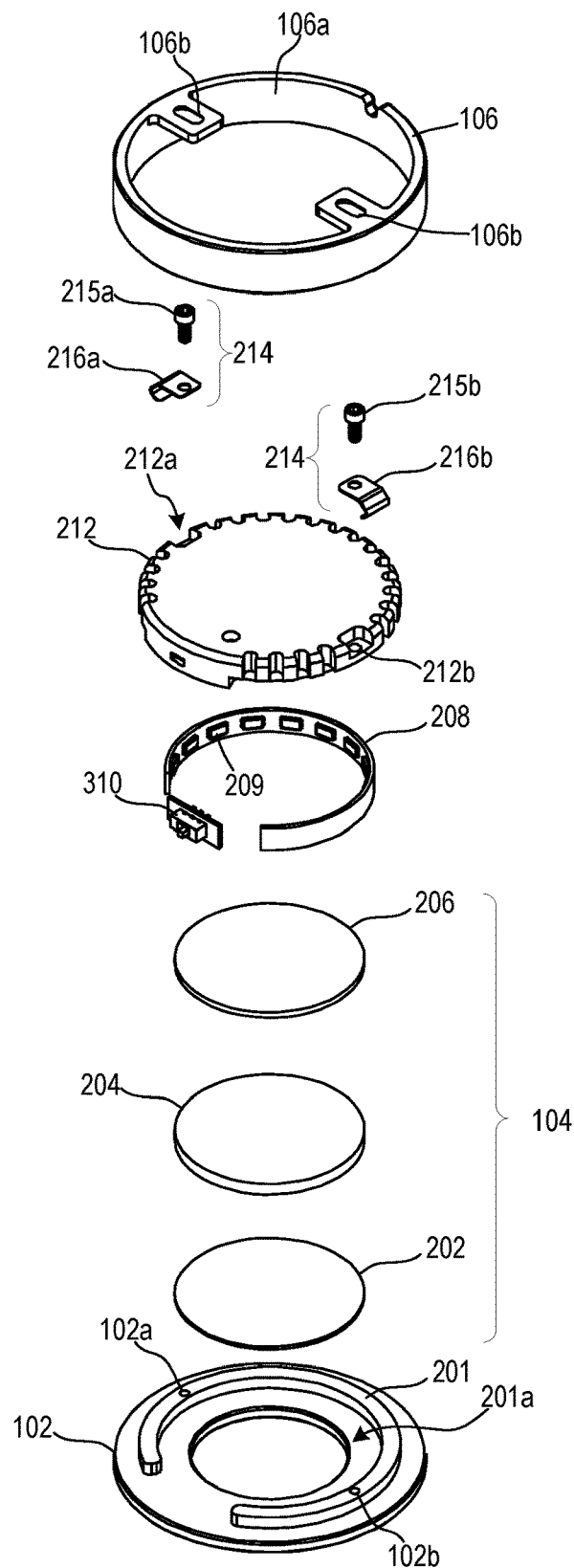
FIG. 2 is an exploded view of a lighting device according to an example.

FIG. 2 is an exploded view of a lighting device according to an example embodiment of the present invention. FIG. 2 corresponds to a lighting device having a circular shape (e.g., the lighting device 100 shown in FIG. 1A). However, lighting devices having other shapes may have the same or substantially the same components as those shown in FIG. 2 but with other suitable shapes corresponding to the shape of the lighting device. Referring to FIG. 2, in various embodiments, the lighting device 100 includes the cover 102, the optic (or the lens assembly) 104, a light source strip 208, a body member 212, and the housing member 106.

The optic 104 has a light emitting face that is exposed through the opening in the cover 102, on the light emitting side of the lighting device 100. In some embodiments, the optic 104 may include a diffuser 202, a lens 204, and a reflector 206. However, in other embodiments, one or more of the diffuser 202, the lens 204, and the reflector 206 may be omitted. Alternatively or in addition, the optic 104 may include one or more other components (e.g., one or more additional lenses, filters, or combinations thereof). The diffuser 202 may be any suitable optical diffuser element. The lens 204 may be any suitable optical lens (such as, but not limited to an acrylic lens, glass, plastic, or the like), for directing or focusing light in a desired manner, such as, but not limited to, a flood light, spot light or other lens. The reflector 206 may be any suitable optical reflector element, to direct light out from the light emitting face of the optic 104. The components of the optic 104 may be made of any suitable material or materials, such as, but not limited to acrylic or other plastic, glass or other ceramic, metal, paper, or the like.

In various embodiments, one or more (or each) of the diffuser 202 and the lens 204 may be configured to be edge-lit, as an edge lit panel ELP, so that light directed inward from a side or periphery of the optic 104 may be guided (or distributed) across the optic 104, and is emitted out from the light emitting face of the optic 104. Alternatively or in addition, a further edge lit panel ELP (not shown) may be interposed between the reflector 206 and the lens 204 or in place of the reflector 206. In those embodiments, the light source strip 208 may be arranged at (e.g., on) or around (e.g., partially or fully surrounding) the periphery of the optic 104 (or one or more of the diffuser 202, lens 204 or further ELP, to emit light into the side edge(s), from the periphery of the optic 104, as described herein.

In other embodiments, the reflector 206 may be omitted or positioned above the body member 212 in the drawings, and the body member 212 may be transparent or partially transparent. In those other embodiments, the transparent or partially transparent body member 212 may be configured to be edge-lit, as an edge lit panel ELP, so that light directed inward from a side or periphery of the body member 212 may be guided (or distributed) across the body member 212, into the optic 104, and out from the light emitting face of the optic 104. In this case, the light source strip 208 may be arranged at (e.g., on) or around (e.g., partially or fully surrounding) a periphery of the body member 212. Accordingly, the light source strip 208 may emit light inward from the periphery of the body member 212, causing the body member 212 to illuminate relatively evenly (e.g., evenly or substantially evenly) across the body member 212. In embodiments in which the optic 104 (or components thereof) is configured as an ELP, the body member 212 need not be transparent or partially transparent.

The body member 212 may provide other functions, including structural support for the light source strip 208, heat conducting to conduct heat away from the light source strip 208 or other components, support for holding or for containing electrical or optical components (or both), or the like. Alternatively or in addition, the body member 212 may provide a structure to which connectors (such as spring clips or brackets 116a and 116b) may be attached for mounting components of the lighting device 100 in a housing or directly to a ceiling, wall or other structure as described herein. The body member 212 may be made of any suitable material including, but not limited to plastic, metal, ceramic, wood, composite material, or the like.

In various embodiments, the body member 212 may be connected (e.g., attached or mounted) to the cover 102 by connector elements 214. The connector elements 214 may include one or more of any suitable connector elements, for example, a screw, a nail, a clip, an adhesive, a rivet, a bracket, and/or the like. In the example in FIG. 2, the connector elements 214 includes a pair of threaded connectors 215a and 215b (such as screws or bolts) and a pair of spring clips or brackets 216a and 216b. The threaded connector 215a extends through an aperture in the bracket 216a and through an aperture 212a in the body member 212. Similarly, the threaded connector 215b extends through an aperture in the bracket 216b and through an aperture 212b in the body member 212. In some examples, the apertures 212a and 212b are threaded, to engage the threaded connectors 215a and 215b, respectively, to couple the bracket 216b to the body member 212. In other examples, the apertures 212a and 212b are not threaded, but provide passages through which the threaded connectors 215a and 215b extend to engage a threaded nut or a threaded apertures in the cover 102 as described below. The brackets 216a and 216b extend (downward in FIG. 2 and) around the periphery of the light source strip 208 and the optic 204, to couple the optic 104 to the body member 212.

In particular examples, the pair of apertures 212a and 212b in the body member 212 are arranged to align with threaded apertures 102a and 102b in the cover 102. In those examples, the threaded connectors 215a and 215b are long enough to extend through the body member 212 and into the apertures 102a and 102b, respectively, to couple the body member 212 to the cover 102.

The cover 102 is configured to connect to the housing member 106 by any suitable connector elements, for example, one or more screws, nails, clips, adhesives, brackets, rivets, friction fitting and/or the like. When connected, the housing member 106 and the cover 102 surrounds and encloses the optic 104, the light source strip 208, and the body member 212.

In the embodiment in FIG. 2, the cover 102 includes a protrusion 201 extending from the surface opposite to the surface of the light emitting face of the device 100. In other embodiments, the protrusion 201 may, instead, be an arrangement of multiple protrusions. The one or more protrusions have a configuration that engages an inner surface 106a of the housing member 106, when the cover 102 is engaged with the housing member 106. In certain examples, the protrusion 201 may provide a friction fit engagement with the inner surface of 106a of the housing 106, to secure (or help secure) the cover 102 to the housing member 106. In further examples, the protrusion 201 provides one or more surfaces through or on which a connector element as described herein may connect the cover 201 to the housing member 106.

In the embodiment in FIG. 2, the protrusion 201 has an open ring or "C" shaped configuration, to correspond to the round cylinder shape of the inner surface 106a of the housing member 106. In other examples, the protrusion 201 may have other suitable shapes corresponding to other shapes for the housing member 106 as described herein. The open ring or "C" shaped configuration of the protrusion 201 defines a circular inner region 201a within or at least partially surrounded by the protrusion, for receiving the optic 104. Accordingly, the optic 104 may be housed within the inner region 201a of the protrusion 201, between the bezel of the cover 102 and the body member 212, and retained by the connector elements 214. The open portion of the open ring or "C" shaped configuration of the protrusion 201 may be configured to receive an extension portion 212c of the body member 212, to help align the body member 212 to the cover 201, during assembly. In other examples, the extension portion 212c may be omitted, and the protrusion 201 may form a complete ring or "O" shape.

The housing 106 may include one or more coupling structures 106b (such as, but not limited to apertures, bracket portions or the like), for allowing the housing 106 to be readily coupled to a surface of a wall, ceiling or other structure, for a surface mount application. In other examples, the housing 106 may be omitted or removed, for recess mounting of the lighting device 100 within a ceiling, wall or other structure, with the optics 104 and cover 102 arranged flush or near flush with an outward-facing surface of the ceiling, wall or other structure. For example, the spring clips or brackets 116a and 116b (or other suitable brackets or connecting structure coupled to the body member 212) may be used to mount the lighting device 100 in a ceiling, wall or other structure, for recessed lighting systems. In yet other examples, the housing 106 is mounted on (or mountable to) a shaft to provide a pendant light configuration or a pole light configuration.

The light source strip 208 includes a flexible substrate or tape having a surface on which a plurality of light source elements 209 are arranged to face outward of the surface. The light source strip 208 is wrapped or arranged around the entire periphery, or a portion of the periphery of the optic 104 or the body member 212 (or both), with the light source elements 209 arranged to emit light inward into the optic 104 or the body member 212 (or both) from the periphery. In certain examples, when enclosed within the housing 106 and cover 102, the light source elements 209 do not overlap with the opening in the cover 102, such that the light source elements 209 are hidden within the bezel of the cover 102.

In various embodiments, the light source strip 208 includes a plurality of light source elements 209 arranged along a length dimension of the light source strip 208. Each of the light source elements 209 may include, for example, one or more light emitting diodes (LEDs), or an array of multiple LEDs. However, in other embodiments, each of the light source elements 209 may include any suitable light source (e.g., LED, incandescent, halogen, fluorescent, combinations thereof, and/or the like). In some embodiments, the light source elements 209 may emit white light. In other embodiments, the light source elements 209 may emit any suitable color, frequency or color temperature of light, or may emit a variety of colored lights or may emit different colored lights from each other. For example, when the light source elements 209 include an array of LEDs, each of the LEDs (or each group of plural groups of LEDs in the array) may emit a light of a different color, frequency or color temperature than each other LED (or each other group of LEDs). In further embodiments, two or more light source elements 209 (or groups of light source elements 209) of different color, frequency or color temperature may be selectively operated concurrently (e.g., simultaneously) to mix and produce a variety of different colors, frequencies or color temperatures, or in series to produce light that changes in color, frequency or temperature over time. Various example arrangements of the light source elements 209 (and groups of light source elements 209) are discussed in more detail with reference to FIGS. 4A through 4C.

Figure 3:
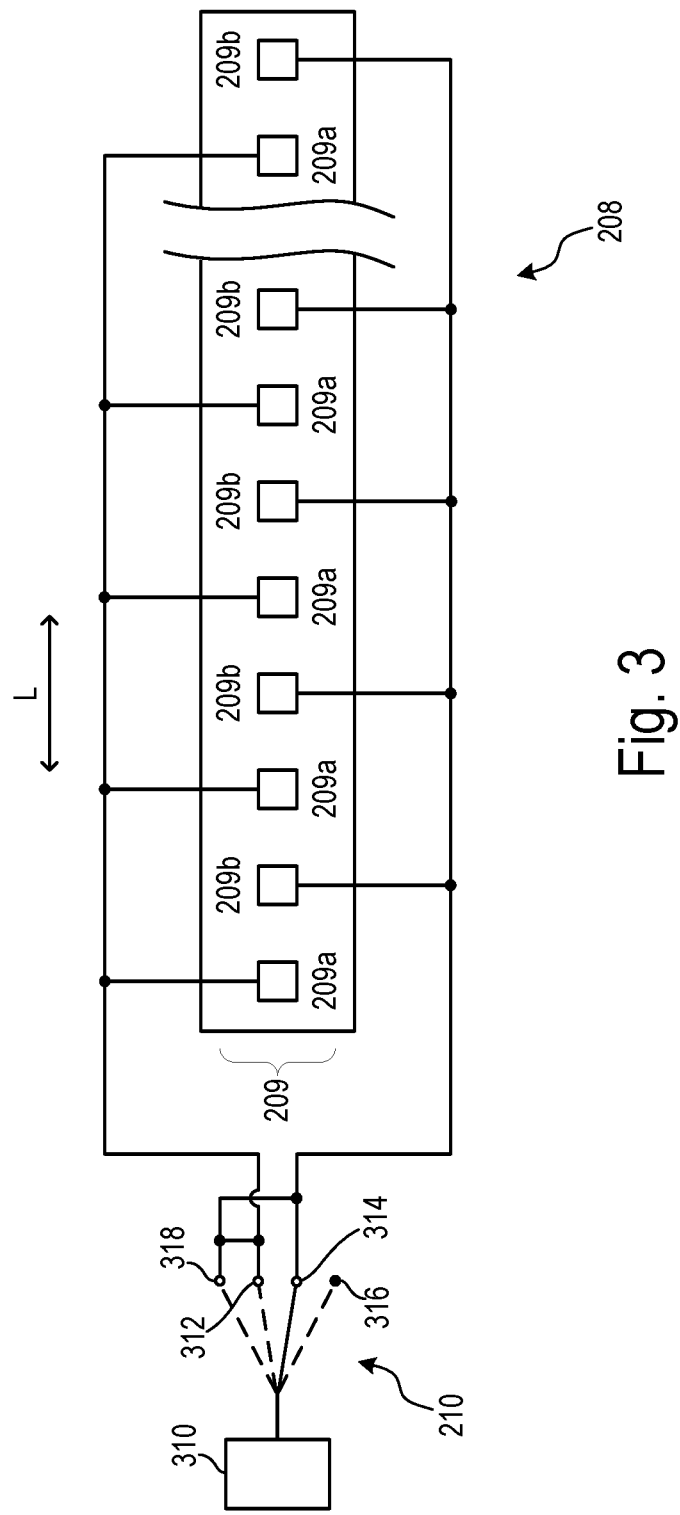
FIG. 3 is a generalized schematic diagram of electronics, including a light source strip, in a lighting device according to an example.

An example of a light source strip 208 is described with reference to FIG. 3, in which a plurality of light source elements 209 are arranged along a length dimension L of the light source strip 208. In FIG. 3, the light source elements 209 include a first group of light source elements 209a and a second group of light source elements 209b that are alternately arranged in a length direction of the light source strip 208. Each group of light source elements includes a plurality of light source elements (209a or 209b in FIG. 3) that are connected or controlled to be activated (ON) or deactivated (OFF), together. In other examples, the light source elements may include more than two groups and may include other arrangements of altering groups of light source elements (two or more elements of one group, followed by two or more elements of another group, and so forth). In other examples, one or more (or each) group of light source elements has only one light source.

Each group of light source elements 209 may be separately controlled to be activated or deactivated, relative to each other group of light source elements 209, by a switch 210. The switch 210 may arranged to connect a power source or driver 310 to groups of light source elements 209, selectively. The switch 210 may be a multi-state switch, that includes a first state (represented by node 312 in FIG. 3) in which a first group of light source elements 209a are coupled to be activated (ON), but each other group of light source elements (e.g., light source elements 209b) are de-activated (OFF). The switch 210 includes a second state (represented by node 314 in FIG. 3) in which the second group of light source elements 209b are coupled to be activated (ON), but each other group of light source elements (e.g., light source elements 209a) are de-activated (OFF). Accordingly, when the switch 210 is in the first state 312, only some (e.g., the first group 209a) of multiple LEDs are turned ON, but when the switch 210 is in a second state 314, only others (e.g., the second group 209b) of the plurality of LED elements 209 are turned ON. In particular examples, the switch 210 may include a further (or third) state (represented by node 316) in which none of the groups of light source elements 209 are activated (ON).

Also in particular examples, the switch 210 may include a further (or fourth) state (represented by node 318) in which both of the groups of light source elements 209a and 209b are coupled to be activated (ON). In this example, the further (or fourth) state may produce a brighter or combined light output of the first and second LED elements 209a and 209b together, while the first state may produce a dimmer output of only the first LED elements 209a (without the second LED elements 209b). Accordingly, a dimming function can be provided, by controlling the state of the switch 210 (and thus, the number of groups of LED elements that will be turned ON).

In examples in which more than two groups of light source elements are included in the lighting device 100 (such n groups, where n represents any number greater than 1), the switch may have n states for activating, separately, each of the n groups, as well as an OFF state in which all groups of light source elements are off. In addition, or alternatively, the switch may have one or more states in which two or more of the n groups of light source elements are activated (ON) at the same time. In some embodiments, the switch 210 may control individual light source elements 209 to be turned ON or turned OFF, separately depending on a state of the switch 210. By controlling the activation state of groups of light source elements 209, the switch 210 may control a brightness (e.g., temperature), color or frequency of light emitted from the lighting device 100.

The switch 210 may be included in or on the lighting device 100, such as, but not limited to, on the light source strip 208. The switch 210 may include a manually operated mechanism (not shown) that is accessible to a user, for operating the switch to change states. In particular examples, the manual operator is included on a remote controller that is coupled for communication to remote control electronics associated with the switch 210, to allow a user to change and control the state of the switch 210 at a limited distance from the lighting device 100. In those examples, the remote control electronics may employ radio frequency RF, Bluetooth, WiFi, or other wireless communication electronics to wirelessly couple the remote controller with the switch 210, for communication. Alternatively or in addition, the switch 210 may include a manual operator (such as, but not limited to, one or more knobs, buttons, toggles, or the like, located on or accessible through the housing 106 or cover 102.

In one example embodiment, the first group of light source elements 209a are LEDs of a first color or temperature output, the second group of light source elements 209b are LEDs of a second color or temperature output that is different from the first color or temperature. In that regard, the switch 210 can be used to control and change the color or temperature of the emitted light. Further, because the lighting device 100 includes a light source strip 208 having a plurality of LED elements 209 along its length, a suitable plurality of LED elements of a given type (or group) are spaced around the side(s) (or perimeter) of the body member 212, and can be activated (in various states of the switch 210) to provide sufficient light output of either one of the colors or temperatures, and provide an even distribution of light from the light emitting face of the lighting device 100, regardless of which group of LEDs are activated.

In another example, the light source strip 208 may include more than two types (or groups) of LED elements to provide more than two color or temperature options. For example, the light source strip 208 may be include three (or more) types of LED elements, including a group of multiple LEDs of a first type (e.g., a first color or temperature), a group of multiple LEDs of a second type (e.g., a second color or temperature) and a group of multiple LEDs of a third type (e.g., a third color or temperature). In such examples, the switch 210 may have at least three ON states, to selectively turn ON (or OFF) each group of LED elements, individually, to select the color or temperature output of the light fixture. In such examples, the LED elements may be arranged along the length of the light source strip 208 in repeating series of first, second, and third types of LED elements. Similar examples can be arranged with more than three types of LED elements.

Figure 4A:
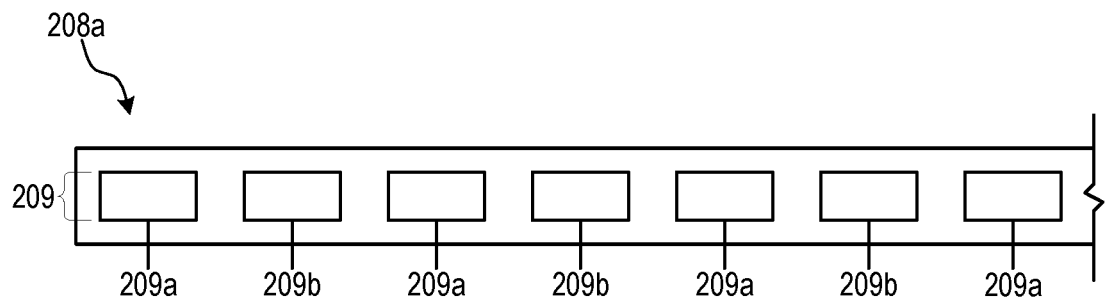
FIGS. 4A-4C are generalized schematic diagrams of light source strips according to various examples.
Figure 4B:
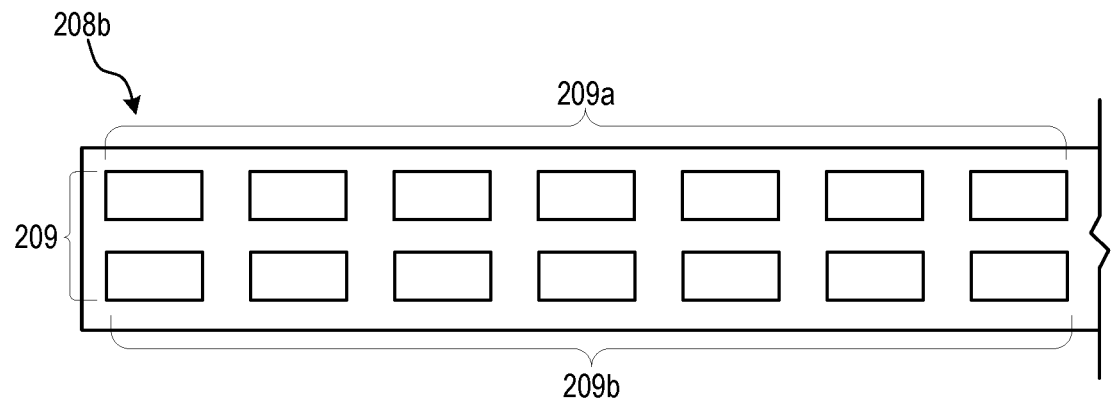
Figure 4C:
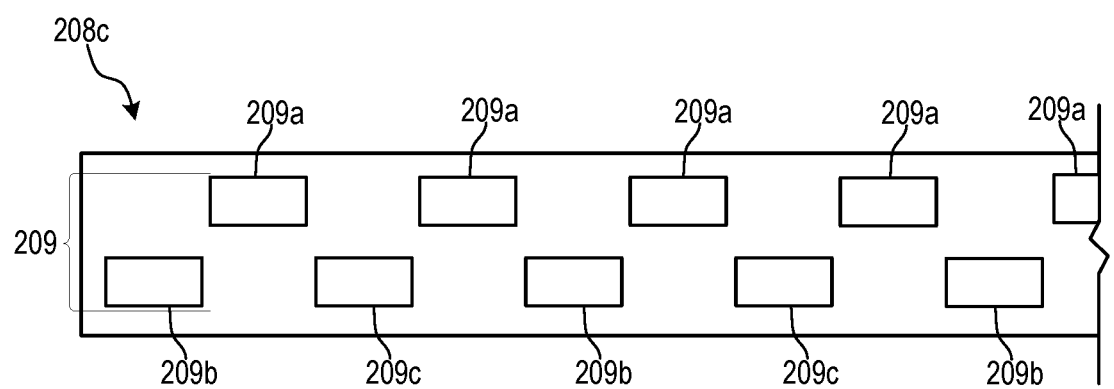

FIGS. 4A-4C show some example arrangements of light source strips. Other embodiments may include other suitable arrangements. Referring to FIGS. 2-4C, in one example, the light source strip 208 includes a plurality of LED elements 209 arranged in one or more rows along the length of the light source strip 208.

The light source strip 208 is secured to the body member 212, optic 104 or the housing 106 (or any combination of those components), and extends around at least a portion of the periphery of the body member 212 or optic 104 (or both), with the LED elements 209 directed radially inward into the peripheral edge or edges of the body member 212 or optic 104 (or both). In particular examples, the light source strip 208 extends around a majority of (such as at least 50%, or such as greater than about 70%), but not the entire, peripheral edge of the body member 212 or optic 104 (or both). In other examples, the light source strip 208 extends around the entire or substantially the entire (greater than about 90%) of the peripheral edge of the body member 212 or optic 104 (or both). The plurality of LED elements 209 can be arranged at equal or even spacing around the side(s) (or perimeter) of the body member 212 or optic 104 (or both), such that the body member 212 or optic 104 (or both), can be illuminated consistently (e.g., without creating dark regions or overly bright regions) for a given color or temperature. Alternatively, the LED elements 209 can be arranged in unequal or uneven spacing for other effects.

In certain examples described herein, the plurality of LED elements 209 include at least two (or more) types of LED elements controlled in two (or more) groups as described herein (such as, for selecting two or more different colors or temperatures). In one example, the LED elements 209 can be arranged in a single, linear row (e.g., alternating between LEDs of different types or groups as discussed above). In another example, the LED elements 209 can be arranged in multiple rows (e.g., parallel rows) of LED elements extending along the length dimension of the light source strip 208, where each row includes LED elements of a different type (and group) relative to each other row. In another example, the LED elements 209 can be arranged in a plurality of parallel rows, where each row can have LEDs of multiple different types (or groups) arranged in an alternating fashion as described herein. However, in yet other embodiments, each of the plurality of LED elements 209 may include the same type of LED element disposed in various groups (or sets), and each group of LED elements may be turned ON or OFF depending on the state of the switch 210.

Referring to FIG. 4A, in one example, the LED elements 209 of different types (or groups) may be alternately arranged in the same row along the length of the light source strip 208a. For example, as shown in FIG. 4A, a first type (or group) of LED elements 209a are alternately arranged with a second type (or group) of LED elements 209b along the length of the light source strip 208a. However, the present invention is not limited thereto, and in other examples, the plurality of LED elements 209 may include any suitable number of types of LED elements arranged in alternating fashion (e.g., an LED of a first type or group, followed by an LED of a second type or group, followed by an LED of a third type or group, followed by another LED of the first type or group, followed by another LED of the second type or group, followed by another LED of the third type or group, and so forth).

Referring to FIG. 4B, in another example, LED elements 209 of different types (or groups) may be arranged in different rows along the length of the light source strip 208b (e.g., LED elements of a first row may each be of a first type or group, LED elements of a second row may each be of a second type or group, LED elements of a third row may each be of a third type or group, and so forth). For example, as shown in FIG. 4B, a first type (or group) of LED elements 209a may be arranged in a first row and a second type (or group) of LED elements 209b may be arranged in a second row. However, in other examples, LED elements of different types (or groups) that are arranged in the same row may be arranged in alternating fashion as discussed above, but may be offset from each adjacent row, so that LED elements of different types (or groups) are alternately arranged in the same column. In this example, a first column may include an LED of a first type or group, followed by an LED of a second type or group, and followed by an LED of a third type or group; a second column may include an LED of a second type or group, followed by an LED of a third type or group, and followed by an LED of a first type or group; a third column may include an LED of a third type or group, followed by an LED of a first type or group, followed by an LED of a second type or group; and so forth.

Referring to FIG. 4C, in another example, LED elements 209 of a first row may each be of the same type, and LED elements 209 of a second row may be alternately arranged as discussed above. For example, as shown in FIG. 4C each of the LED elements 209 of a first row may be of a first type (or group) 209a, and the LED elements 209 in a second row may be alternately arranged along a length of the light source strip 208c. For example, the second row may include LED elements of a second type (or group) 209b alternately arranged with LED elements of a third type (or group) 209c. The first type of LED elements 209a may be arranged to overlap with a space (or gap) between the second and third types of LED elements 209b and 209c. However, in another embodiment, the first type of LED elements 209a may overlap with only the second type of LED elements 209b or only the third type of LED elements 209c, or the first type of LED elements 209a may overlap with each of the second type of LED elements 209b and the third type of LED elements 209c.

Figure 5:
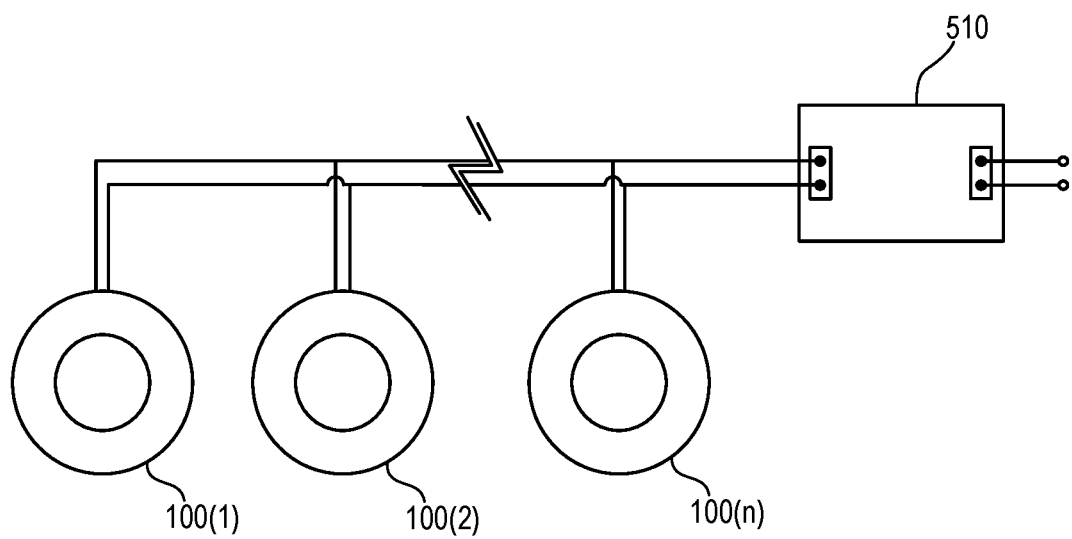
FIG. 5 is an example of a lighting system according to an example.

A lighting system according to an example embodiment may include one or more lighting devices as described herein. For example, the lighting system in FIG. 5 includes a plurality of lighting devices 100(1) through 100(n) (where n corresponds to any natural number), each connected to a common controller, power source or driver 510. For example, the lighting devices 100(1) through 100(n) may be connected to each other in a daisy chain, and the driver 510 may control each of the plurality of lighting devices 100(1) through 100(n) in any of the manners previously discussed. For example, the driver 510 may control the switch 210 of each of the lighting devices 100(1) through 100(n) to control various groups of LED elements 209 to be turned ON or turned OFF for of each of the lighting devices 100(1) through 100(n) together, or individually.

The foregoing description of illustrative embodiments has been presented for purposes of illustration and of description. It is not intended to be exhaustive or limiting, and modifications and variations may be possible in light of the above teachings or may be acquired from practice of the disclosed embodiments. Various modifications and changes that come within the meaning and range of equivalency of the claims are intended to be within the scope of the invention. Thus, while certain embodiments of the present invention have been illustrated and described, it is understood by those of ordinary skill in the art that certain modifications and changes can be made to the described embodiments without departing from the spirit and scope of the present invention as defined by the following claims, and equivalents thereof.

What is claimed is:

1. A lighting device comprising:
   at least one panel configured to be edge lit;
   a light emitting diode (LED) strip at a periphery of the at least one panel for directing light into a peripheral edge of the at least one panel; and
   a switch connected to the LED strip,
   wherein the LED strip comprises:
   a flexible substrate or tape having a first surface;
   a first group of LED elements arranged on the flexible substrate or tape, along a length dimension of the flexible substrate or tape, to face outward from the first surface of the flexible substrate or tape; and a second group of LED elements arranged on the flexible substrate or tape, along the length dimension of the flexible substrate or tape and to face outward from the first surface, wherein the first surface faces the peripheral edge of the at least one panel;

wherein the switch is configured to turn ON the first group of LED elements when the switch is in a first state, and to turn ON the second group of LED elements when the switch is in a second state; and wherein the first group of LED elements are of a different color than that of the second group of LED elements.

2. The lighting device of claim 1, wherein the first and second groups of LED elements face into at least a portion of the peripheral edge of the at least one panel.

3. The lighting device of claim 2, wherein the LED strip is configured to illuminate the panel.

4. The lighting device of claim 1, wherein the switch is configured to turn OFF the second group of LED elements when the switch is in the first state, and to turn OFF the first group of LED elements when the switch is in the second state.

5. The lighting device of claim 1, wherein the switch is configured to turn OFF the second group of LED elements when the switch is in the first state, and to turn ON both the first and second group of LED elements when the switch is in the second state.

6. The lighting device of claim 1, wherein the first group of LED elements are of a different temperature than that of the second group of LED elements.

7. The lighting device of claim 1, wherein the first group of LED elements are alternately arranged with the second group of LED elements along the length dimension of the flexible substrate or tape.

8. The lighting device of claim 1, wherein the first group of LED elements are arranged along a first row extending along the length dimension of the flexible substrate or tape, and the second group of LED elements are arranged along a second row extending along the length dimension of the flexible substrate or tape, wherein the first row and the second row are offset from each other in a direction transverse to the length dimension of the flexible substrate or tape.

9. The lighting device of claim 1, further comprising a third group of LED elements arranged along the length dimension of the flexible substrate or tape.

10. The lighting device of claim 9, wherein the first, second, and third group of LED elements are of a different color from each other.

11. The lighting device of claim 9, wherein the first, second, and third group of LED elements are of a different temperature from each other.

12. The lighting device of claim 9, wherein the first group of LED elements are arranged along a first row along the length dimension of the flexible substrate or tape, and the second group of LED elements are alternately arranged with the third group of LED elements along a second row parallel to the first row along the length dimension of the flexible substrate or tape.

13. The lighting device of claim 12, wherein the first group of LED elements are aligned with corresponding spaces between the alternating second and third group of LED elements.

14. The lighting device of claim 12, wherein each of the first group of LED elements are aligned with each of the second and third group of LED elements.

15. The lighting device of claim 1, wherein the peripheral edge of the at least one panel comprises at least one side surface that extends around an entire perimeter of the at least one panel and wherein the flexible tape or substrate extends around the at least one side surface along a majority of the perimeter of the at least one panel.

16. The lighting device of claim 15, wherein the flexible tape or substrate extends around more than 70% of the perimeter of the at least one panel.

17. The lighting device of claim 1, wherein the first group of LED elements mix to produce a first color, and wherein the second group of LED elements mix to produce a second color that is different from the first color.

18. A lighting device comprising:
at least one panel configured to be edge lit;
a light emitting diode (LED) strip at a periphery of the at least one panel for directing light into a peripheral edge of the at least one panel; and
a switch connected to the LED strip,
wherein the LED strip comprises:
a flexible substrate or tape having a first surface;
a first group of LED elements arranged on the flexible substrate or tape, along a length dimension of the flexible substrate or tape, to face outward from the first surface of the flexible substrate or tape; and
a second group of LED elements arranged on the flexible substrate or tape, along the length dimension of the flexible substrate or tape and to face outward from the first surface,
wherein the first surface faces the peripheral edge of the at least one panel;
wherein the switch is configured to turn ON the first group of LED elements when the switch is in a first state, and to turn ON the second group of LED elements when the switch is in a second state; and
wherein the first, second, and third group of LED elements are alternately arranged in one or more rows extending along the length dimension of the flexible substrate or tape wherein each row has at least one LED element from the first group of LED elements, followed by at least one LED from the second group of LED elements, followed by at least one LED from the third group of LED elements, followed by at least one further LED element from the first group of LED elements.

19. A lighting assembly comprising:
a light emitting diode (LED) strip arranged at a periphery of a panel configured to be edge lit; and
a switch connected to the LED strip,
wherein the LED strip comprises:
a flexible substrate or tape having a first surface facing toward the periphery of the panel;
a first group of LED elements arranged along a length dimension of the flexible substrate or tape, each LED element in the first group facing outward from the first surface of the flexible substrate or tape, and facing toward the periphery of the panel; and
a second group of LED elements arranged along the length dimension of the flexible substrate or tape, each LED element in the second group facing outward from the first surface of the flexible substrate or tape, and facing toward the periphery of the panel, and
wherein the switch is configured to turn ON the first group of LED elements when the switch is in a first state, and to turn ON the second group of LED elements when the switch is in a second state; and wherein the first group of LED elements are of a different color or temperature than that of the second group of LED elements.

20. The lighting assembly of claim 19, wherein the first group of LED elements are alternately arranged with the second group of LED elements along the length dimension of the flexible substrate or tape.

21. The lighting assembly of claim 19, wherein the first group of LED elements are arranged along a first row along the length dimension of the flexible substrate or tape, and the second group of LED elements are arranged along a second row parallel to the first row along the length dimension of the flexible substrate or tape.

22. The lighting device of claim 19, wherein the first group of LED elements mix to produce a first color or first temperature, and wherein the second group of LED elements mix to produce a second color or second temperature that is different from the first color or first temperature.

\* \* \* \* \*